United States Patent
Chon (10) Patent No.: US 12,365,265 B2
(45) Date of Patent: Jul. 22, 2025

(54) VEHICLE AND CONTROL METHOD THEREOF

(71) Applicants: Hyundai Motor Company, Seoul (KR); Kia Corporation, Seoul (KR)

(72) Inventor: Un Chon, Seongnam-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 315 days.

(21) Appl. No.: 18/077,830

(22) Filed: Dec. 8, 2022

(65) Prior Publication Data

US 2023/0406155 A1    Dec. 21, 2023

(30) Foreign Application Priority Data

May 23, 2022  (KR) .......................... 10-2022-0062883

(51) Int. Cl.
| | |
|---|---|
| *B60L 58/20* | (2019.01) |
| *B60L 50/60* | (2019.01) |
| *B60L 58/19* | (2019.01) |
| *B60L 58/22* | (2019.01) |
| *H02J 7/00* | (2006.01) |

(52) U.S. Cl.
CPC .............. *B60L 58/20* (2019.02); *B60L 50/66* (2019.02); *B60L 58/19* (2019.02); *B60L 58/22* (2019.02); *H02J 7/0016* (2013.01); *B60L 2240/547* (2013.01); *H02J 7/0024* (2013.01)

(58) Field of Classification Search
CPC .......... B60L 50/66; B60L 58/19; B60L 58/20; B60L 58/22; B60L 2240/547; H02J 7/0016; H02J 7/0024
See application file for complete search history.

(56) References Cited

U.S. PATENT DOCUMENTS

| | | | |
|---|---|---|---|
| 2018/0254658 A1* | 9/2018 | Koerner | H02J 7/1423 |
| 2019/0013681 A1* | 1/2019 | De Breucker | H02J 7/0024 |
| 2019/0283611 A1* | 9/2019 | Conlon | H02J 3/322 |
| 2021/0078429 A1* | 3/2021 | Li | B60L 58/21 |
| 2022/0089030 A1* | 3/2022 | Norberg | H02J 7/0063 |
| 2022/0097563 A1* | 3/2022 | Heydel | B60L 58/19 |
| 2023/0001814 A1* | 1/2023 | Slepchenkov | B60L 58/21 |
| 2023/0074308 A1* | 3/2023 | Namuduri | B60L 58/19 |
| 2023/0150378 A1* | 5/2023 | Hao | B60L 53/14 320/104 |

* cited by examiner

*Primary Examiner* — Dale Moyer
(74) *Attorney, Agent, or Firm* — Morgan, Lewis & Bockius LLP

(57) ABSTRACT

A vehicle includes a driving motor, an electric load, a battery pack including a plurality of battery modules that supplies power to at least one of the driving motor and the electric load and a switch module provided between the plurality of battery modules, and a controller operatively connected to the switch module and configured to control the switch module. The controller may be further configured to control the switch module to supply a power including a first voltage to the driving motor and to supply a power including a second voltage less than the first voltage to the electric load through the switch module.

19 Claims, 7 Drawing Sheets

| POWER MODE | S111 | S112 | S113 |
|---|---|---|---|
| CHARGING | ○ | × | × |
| DISCHARGING | × | ○ | ○ |

○ : SWITCH ON
× : SWITCH OFF

| POWER MODE | | S111 | S121 | S131 | S112 | S122 | S132 | S113 | S123 | S133 |
|---|---|---|---|---|---|---|---|---|---|---|
| CHARGING | | ○ | ○ | ○ | × | × | × | × | × | × |
| LOW LOAD | LOW-VOLTAGE DISCHARGING | × | ○:LV+HV △:LV only | ○:LV+HV △:LV only | ○ | × | × | × | × | × |
| | HIGH-VOLTAGE DISCHARGING | × | ○ | ○ | ○:LV+HV △:LV only | × | × | × | × | × |
| MIDDLE LOAD | LOW-VOLTAGE DISCHARGING | × | × | ○:LV+HV △:LV only | ○ | ○ | × | × | ○:LV+HV △:LV only | × |
| | HIGH-VOLTAGE DISCHARGING | × | × | ○ | ○:LV+HV △:LV only | ○:LV+HV △:LV only | × | ○:LV+HV △:LV only | ○ | × |
| LOW LOAD | LOW-VOLTAGE DISCHARGING | × | × | × | ○ | ○ | ○ | ○:LV+HV △:LV only | ○ | × |
| | HIGH-VOLTAGE DISCHARGING | × | × | × | ○:LV+HV △:LV only | ○:LV+HV △:LV only | ○:LV+HV △:LV only | ○:LV+HV △:LV only | ○:LV+HV △:LV only | ○ |

○ : SWITCH ON
× : SWITCH OFF
△ : REGARDLESS OF SWITCH ON/OFF

| POWER MODE | SI11 | SI21 | SI31 | SI12 | SI22 | SI23 | SI13 | SI23 | SI33 | SI24 | SI34 |
|---|---|---|---|---|---|---|---|---|---|---|---|
| CHARGING | O | O | O | X | X | X | X | X | X | X | X |
| B1 LOW-VOLTAGE DISCHARGING | X | O | O | O | X | X | O | X | X | X | X |
| B2 LOW-VOLTAGE DISCHARGING | X | X | O | X | O | X | O | X | X | O | X |
| B3 LOW-VOLTAGE DISCHARGING | O | X | X | X | X | O | X | O | X | X | O |

O : SWITCH ON
X : SWITCH OFF

VEHICLE AND CONTROL METHOD THEREOF

CROSS-REFERENCE TO RELATED APPLICATION(S)

The present application claims priority to Korean Patent Application No. 10-2022-0062883, filed on May 23, 2022, the entire contents of which is incorporated herein for all purposes by this reference.

BACKGROUND OF THE PRESENT DISCLOSURE

Field of the Present Disclosure

The present disclosure relates to a vehicle and a control method thereof, and more particularly, to a vehicle including a battery pack capable of outputting power of various voltages, and a method of controlling the vehicle.

Description of Related Art

In general, a vehicle refers to a transportation means or a transport means that travels on a road or a track using fossil fuels, electricity, etc., as a power source.

Recently, research on electric vehicles using only electricity as an energy source has been actively conducted. An electric vehicle includes a battery as a driving energy source for moving the vehicle, and also includes a battery as an auxiliary energy source for providing convenience and safety to a driver.

The power (or voltage) required by a motor for driving the vehicle is quite different from the power (or voltage) required by electronic components for assisting the driver. As a result, the electric vehicle still includes the main battery pack as the driving energy source and the auxiliary battery pack as the auxiliary energy source, separately.

As the main battery pack and the separate auxiliary battery pack are provided, the weight of the vehicle may increase and the range of the vehicle may decrease.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle including a single battery pack excluding an auxiliary battery pack, and a method of controlling the vehicle.

Additional aspects of the present disclosure will be set forth in part in the description which follows, and in part, will be obvious from the description, or may be learned by practice of the present disclosure.

In accordance with an aspect of the present disclosure, a vehicle includes a driving motor, an electric load, a battery pack including a plurality of battery modules that supplies power to at least one of the driving motor and the electric load and a switch module provided between the plurality of battery modules, and a controller operatively connected to the switch module and configured to control the switch module. The controller may be further configured to control the switch module to supply a power including a first voltage to the driving motor and to supply a power including a second voltage less than the first voltage to the electric load through the switch module.

The controller may be further configured to control the switch module to connect or separate at least one battery module among the plurality of battery modules to or from the electric load, based on charging and discharging of the battery pack.

The switch modules may include a first switch provided between the at least one battery module and the other battery modules and a second switch provided between the at least one battery module and the electric load.

The controller may be further configured to turn on the first switch and turn off the second switch to charge the battery pack and to turn off the first switch and turn on the second switch to supply a power to the electric load.

The controller may be further configured to control the switch module to electrically connect at least one of a first battery module and a second battery module among the plurality of battery modules to the electric load, based on a load size of the electric load.

The controller may be further configured to control the switch module to electrically connect the first battery module to the electric load when a required power of the electric load is less than a reference power and to control the switch module to electrically connect the first battery module and the second battery module to the electric load when the required power of the electric load is equal to or greater than the reference power.

The switch modules may include a first switch provided between the first battery module and the other battery modules, a second switch provided between the first battery module and the electric load, a third switch provided between the second battery module and the other battery modules, and a fourth switch provided between the second battery module and the electric load.

The controller may be further configured to turn off the first switch and the fourth switch and turn on the second switch and the third switch to supply a first power to the electric load and to turn off the first switch and the third switch and turn on the second switch and the fourth switch to supply a second power greater than the first power to the electric load.

The controller may be further configured to control the switch module to alternately connect a first battery module and a second battery module among the plurality of battery modules to the electric load, based on output voltages of the battery modules.

The switch modules may include a first switch provided between the first battery module and the other battery modules, a second switch provided between the first battery module and the electric load, a third switch configured to bypass the first battery module, a fourth switch provided between the second battery module and the other battery modules, a fifth switch provided between the second battery module and the electric load, and a sixth switch configured to bypass the second battery module.

The controller may be further configured to turn off the first switch, the fourth switch, and the sixth switch and turn on the second switch, the third switch, and the fourth switch to allow the first battery module to supply a power to the electric load and to turn on the first switch, the fourth switch, and the sixth switch and turn off the second switch, the third switch, and the fourth switch to allow the second battery module to supply a power to the electric load.

In accordance with another aspect of the present disclosure, a method of controlling a vehicle including a driving motor, an electric load, and a battery pack includes supplying, by a plurality of battery modules included in the battery pack, a power including a first voltage to the driving motor and supplying, by at least one battery module among the plurality of battery modules included in the battery pack, a power including a second voltage less than the first voltage to the electric load.

The control method may further include connecting or separating at least one battery module among the plurality of battery modules to or from the electric load, based on charging and discharging of the battery pack.

The control method may further include to charge the battery pack, turning on a first switch provided between the at least one battery module and the other battery modules and turning off a second switch provided between the at least one battery module and the electric load, and to supply a power to the electric load, turning off the first switch and turning on the second switch.

The control method may further include electrically connecting a first battery module or a second battery module of the at least one battery module to the electric load, based on a load size of the electric load.

The control method may further include electrically connecting the first battery module to the electric load when a required power of the electric load is less than a reference power and electrically connecting the first battery module and the second battery module to the electric load when the required power of the electric load is equal to or greater than the reference power.

The control method may further include, to supply a first power to the electric load, turning off a first switch provided between the first battery module and the other battery modules, tuning on a second switch provided between the first battery module and the electric load, turning on a third switch provided between the second battery module and the other battery modules, and turning off a fourth switch provided between the second battery module and the electric load, and to supply a second power greater than the first power to the electric load, turning off the first switch and the third switch and turning on the second switch and the fourth switch.

The control method may further include alternately connecting the first battery module and the second battery module among the plurality of battery modules to the electric load, based on output voltages of the battery modules.

The control method may further include turning off a first switch provided between the first battery module and the other battery modules, turning on a second switch provided between the first battery module and the electric load, and turning on a third switch that bypasses the first battery module to allow the first battery module to supply a power to the electric load, and turning off a fourth switch provided between the second battery module and the other battery modules, turning on a fifth switch provided between the second battery module and the electric load, and turning on a sixth switch that bypasses the second battery module to allow the second battery module to supply a power to the electric load.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like reference numerals refer to like elements throughout. This specification does not describe all elements of the disclosed exemplary embodiments and detailed descriptions of what is well known in the art or redundant descriptions on substantially the same configurations have been omitted. The terms 'part', 'module', 'member', 'block' and the like as used in the specification may be implemented in software or hardware. Furthermore, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, operating principles and embodiments of the present disclosure will be described in detail with reference to the accompanying drawings.

Figure 1:
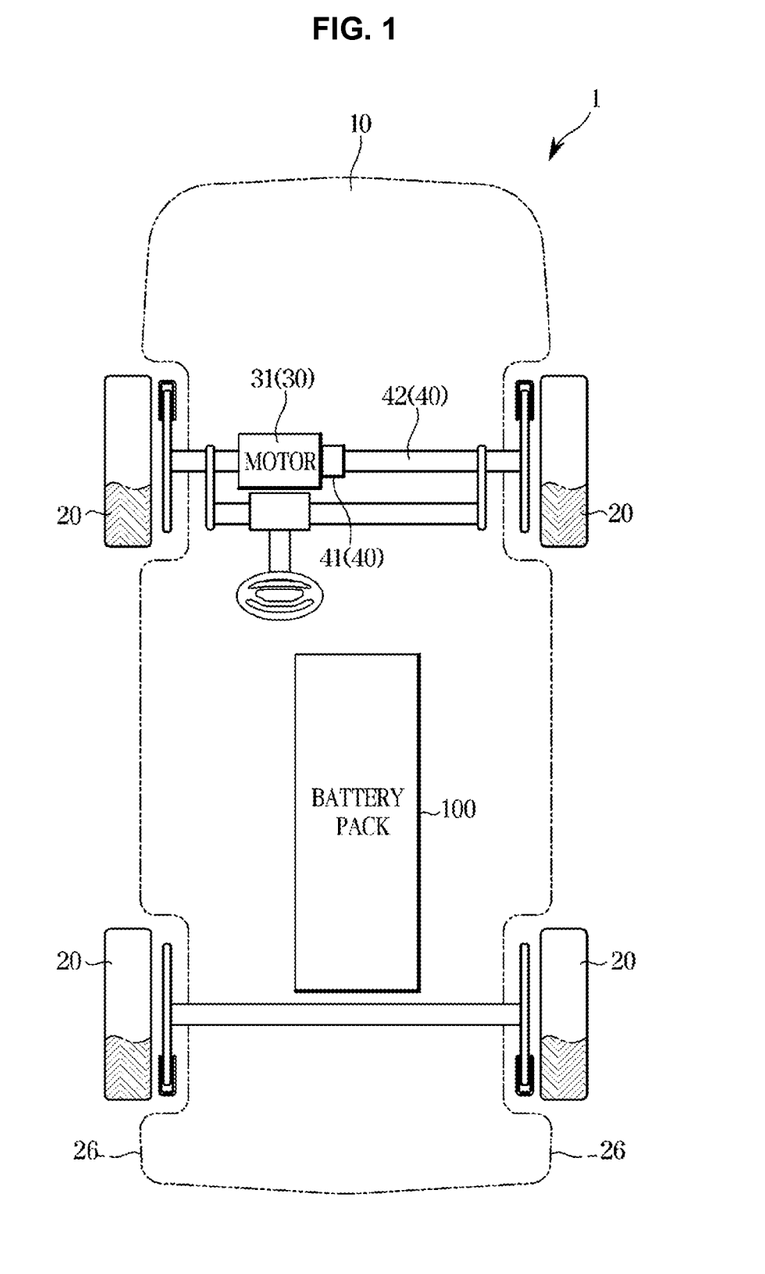
FIG. 1 simply illustrates a structure of a vehicle according to an exemplary embodiment of the present disclosure.

FIG. 1 simply illustrates a structure of a vehicle according to an exemplary embodiment of the present disclosure.

A vehicle 1 may include a body that accommodates a driver and/or a baggage, and a chassis including a power generation unit, a power transfer unit, a braking system, a steering unit, etc., as well as the body.

As illustrated in FIG. 1, the chassis of the vehicle 1 may include a frame 10, wheels 20, a power generation unit 30, and a power transfer unit 40.

The power generation unit 30 may generate a rotation force for driving of the vehicle 1, and include a driving motor 31, a battery pack 100, and so forth. The battery pack 100 may store electrical energy, and the driving motor 31 may generate a power (e.g., a rotation force or a torque) for driving the vehicle 1 by use of the electrical energy stored in the battery pack 100.

The power transfer unit 40 may transfer the rotation force generated by the power generation unit 30 to the wheels 20 and include a decelerator 41, a shaft 42, etc. The decelerator 41 may decelerate rotation of the driving motor 31 and transfer the decelerated torque to the shaft 42. The wheels 20 may be provided in both end portions of the shaft 42, and the torque of the shaft 42 may be transferred to the wheels 20.

The wheels 20 may receive the power generated by the power generation unit 30 through the power transfer unit 40, and move the vehicle 1. The wheels 20 may include front wheels disposed in a front portion of the vehicle 1 and rear wheels disposed in a rear portion of the vehicle 1.

The frame 10 may fix the wheels 20 and support the power generation unit 30, the power transfer unit 40, etc.

While a vehicle including the driving motor 31 and the battery pack 100, i.e., an electric vehicle is illustrated in FIG. 1, the vehicle according to an exemplary embodiment of the present disclosure is not limited to the electric vehicle. For example, the vehicle may include a driving motor and an engine and may include a hybrid vehicle driven by a driving motor or an engine.

Figure 2:
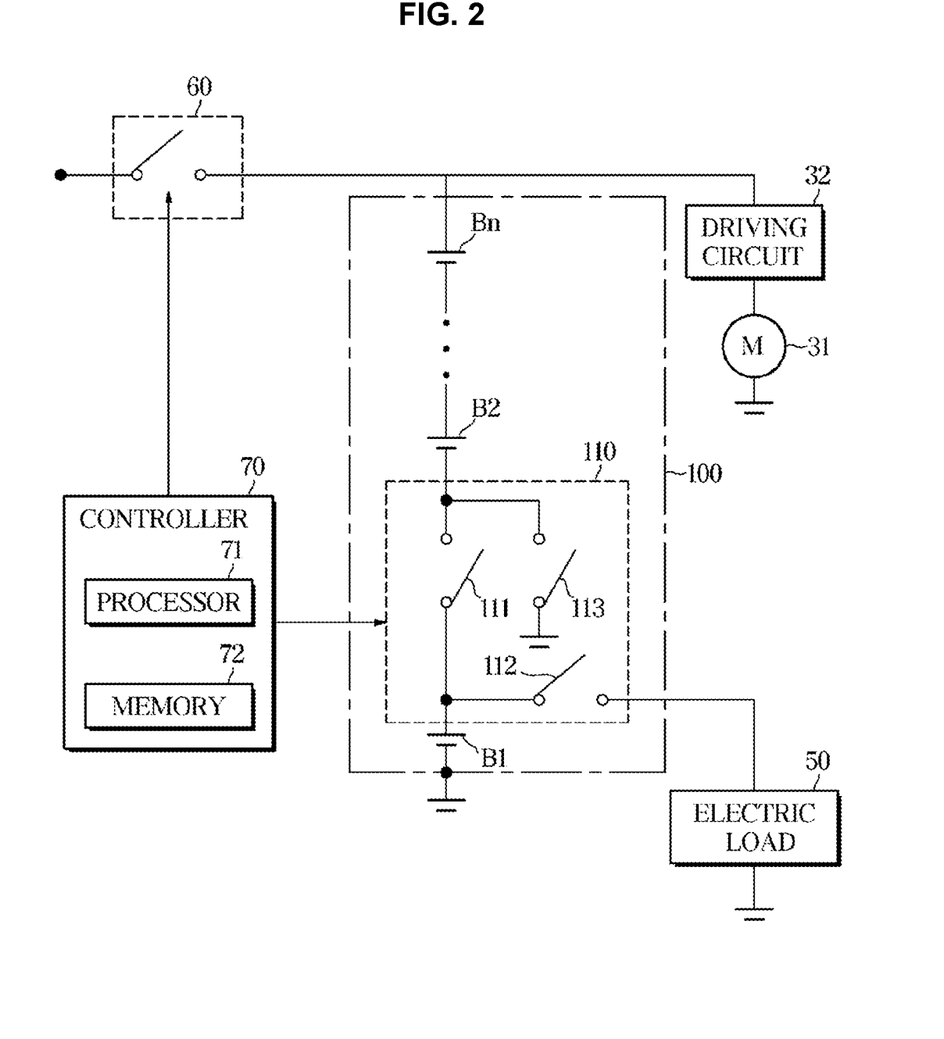
FIG. 2 illustrates an example of a battery included in a vehicle according to an exemplary embodiment of the present disclosure.
Figure 3:
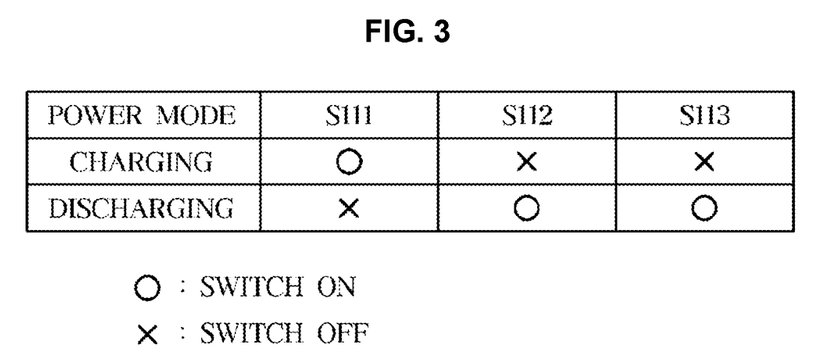
FIG. 3 illustrates an example for controlling a switch module shown in FIG. 2.

FIG. 2 illustrates an example of a battery included in a vehicle according to an exemplary embodiment of the present disclosure. FIG. 3 illustrates an example for controlling a switch module shown in FIG. 2.

Referring to FIG. 2 and FIG. 3, the vehicle 1 may include a driving circuit 32, a driving motor 31, a battery pack 100, an electric load 50, a charging control switch 60, and a controller 70.

The driving circuit 32 may be electrically connected to the battery pack 100 and obtain direct current power from the battery pack 100.

The driving circuit 32 may convert direct-current power of the battery pack 100 into alternating-current power and supply the converted alternating-current power to the driving motor 31. That is, the driving circuit 32 may convert and control power supplied to the driving motor 31 from the battery pack 100.

The driving circuit 32 may include an inverter for converting the direct-current power into the alternating-current power. The inverter may include a plurality of switch elements for regulating current flowing in the driving motor 31. The plurality of switch elements included in the inverter may convert the direct-current power of the battery pack 100 into the alternating-current power according to a control signal of the controller 70.

The driving motor 31 may be electrically connected to the driving circuit 32 and obtain the alternating-current power from the driving circuit 32. The driving motor 31 may convert the alternating-current power converted by the driving circuit 32 into torque (rotation or a rotation force).

The driving motor 31 may include a stator fixed to the vehicle 1 and a rotor rotatably provided on the stator. The rotor may rotate by magnetic interaction between the stator and the rotor.

For example, the rotor may include a permanent magnet and the stator may include a coil. The alternating current power converted by the driving circuit 32 may be supplied to the coil of the stator, and an alternating-current magnetic field changing temporally may be generated around the coil. The rotor may rotate by magnetic interaction between the changing magnetic field of the coil and the magnetic field of the permanent magnet.

In another example, the rotor may include a magnetic body and the stator may include a coil. By the alternating-current power, the alternating-current magnetic field changing temporally may be generated around the coil. The magnetic body may be magnetized by the alternating-current magnetic field of the coil, and the rotor may rotate by the magnetic interaction between the magnetic field of the magnetized magnetic body and the changing magnetic field of the coil.

The driving motor 31 may be a three-phase motor including three terminals and three coils. The three terminals and the three coils may be connected by various connection methods. For example, the three coils may be connected to one another by star connection (or Y connection) where one end portions of the three coils are connected at one node. In another example, the three coils may be connected by delta connection where both end portions of each of the three coils are connected to different coils. The three-phase terminals of the driving motor 31 may include an A-phase terminal, a B-phase terminal, and a C-phase terminal.

The electric load 50 may be electrically connected to the battery pack 100 and obtain direct-current power from the battery pack 100.

The electric load 50 may be a device configured for driving/braking/steering the vehicle 1 or providing convenience to a driver of the vehicle 1. The electric load 50 may include, for example, an engine management system (EMS), a transmission control unit (TCU), an electronic brake control module (EBCM), a motor-driven power steering (MOPS) device, a body control module (BCM), an audio device, a heating/ventilation/air conditioning (HVAC) device, a navigation device, a power sheet, a sheet heater, a headlight, etc.

The electric load 50 may obtain direct-current power of a voltage different from the driving circuit 32 from the battery pack 100. In general, the voltage of the power supplied to the driving circuit 32 from the battery pack 100 (hereinafter, referred to as a 'high voltage') is greater than a voltage of power supplied to the electric load 50 from the battery pack 100. For example, the voltage of the power supplied to the driving circuit 32 from the battery pack 100 may be between about 200 V (volt) and 800 V or higher. On the other hand, the voltage of the power supplied to the electric load 50 from the battery pack 100 may be between 12V and 48V.

The battery pack 100 may store electrical energy and supply direct-current power to electric devices included in the vehicle 1. The battery pack 100 may supply direct-current power to the driving circuit 32, the driving motor 31, the electrical load 50, and/or the controller 70.

The battery pack 100 may output high-voltage power to the driving circuit 32 and the driving motor 31. For example, the battery pack 100 may output power of a voltage between 200 V and 800 V or higher. The battery pack 100 may also output high-voltage power to the electric load 50 and the controller 70. For example, the battery pack 100 may output power of a voltage between 12 V and 48 V.

The battery pack 100 may include a plurality of battery cells. The plurality of battery cells may be serially connected to one another. Through serial connection among the plurality of battery cells, the voltage output from the battery pack 100 may be equal to a sum of voltages respectively output from the plurality of battery cells. For example, lithium-ion battery cells widely used as an electric vehicle battery are known as outputting power including a nominal voltage of about 3.7 V. A battery where 100 lithium-ion battery cells are connected in series may output power including a nominal voltage of about 370 V.

As illustrated in FIG. 2, the plurality of battery cells forming the battery pack 100 may be grouped into a plurality of battery modules B1, B2, B3, B4, . . . , Bn. For example, each of the battery modules B1, B2, B3, B4, . . . , Bn may include four battery cells. For lithium-ion battery cells, each of the battery modules B1, B2, B3, B4, . . . , Bn may output power including a nominal voltage of about 14.8 V.

To supply low-voltage power to the electric load 50 and the controller 70, low-voltage power may be output from any one of the plurality of battery modules B1, B2, B3, B4, . . . , Bn. That is, the plurality of battery modules B1, B2, B3, B4, . . . , Bn of the battery pack 100 may output high-voltage power to the driving circuit 32 and the driving motor 31, and any one of the plurality of battery modules B1, B2, B3, B4, . . . , Bn may output low-voltage power to the electric load 50 and the controller 70.

The plurality of battery modules B1, B2, B3, B4, . . . , Bn may be serially connected to supply the high-voltage power to the driving circuit 32 and the driving motor 31. Herein, some of the plurality of battery modules B1, B2, B3, B4, . . . , Bn may supply the low-voltage power to the electric load 50. For example, the first battery module B1 may supply the low-voltage power to the electric load 50.

The first battery module B1 may be electrically connected to the second battery module B2. A first switch module 110 may be provided between the first battery module B1 and the second battery module B2. The first battery module B1 and the second battery module B2 may be connected through the first switch module 110.

The first switch module 110 may be electrically connected to the electric load 50. The low-voltage power output from the first battery module B1 may be supplied to the electric load 50 through the first switch module 110. Accordingly, the first switch module 110 may electrically separate the first battery module B1 from the other battery modules and electrically connect the first battery module B1 to the electric load 50 so that the first battery module B1 may supply low-voltage power to the electric load 50.

The first switch module 110 may be connected to the ground of the vehicle 1, and may connect the second battery module B2 to the ground of the vehicle 1. Thus, while the first battery module B1 supplies the low-voltage power to the electric load 50, the other battery modules may supply high-voltage power to the driving circuit 32 and the driving motor 31.

To charge the battery pack 100, the first switch module 110 may electrically connect the first battery module B1 to the other battery modules and electrically separate the first battery module B1 from the electric load 50. Thus, the first battery module B1 may be charged by an external power source together with the other battery modules. Furthermore, during charging of the battery modules B1, B2, B3, B4, . . . , Bn, damage resulting from charging may not be caused to the electric load 50.

The first switch module 110 may include a plurality of switches. The first switch module 110 may include switches 111, 112, and 113.

The switch 111 may be provided between the first battery module B1 and the second battery module B2, and may be serially connected to the first battery module B1 and the second battery module B2. The switch 111 may electrically connect the first battery module B1 to the other battery modules or electrically separate the first battery module B1 from the other battery modules. The first battery module B1 may be electrically connected to the other battery modules when the switch 111 is on (closed), and the first battery module B1 may be electrically separated from the other battery modules when the switch 111 is off (open).

The switch 112 may be provided between the first battery module B1 (a positive terminal) and the electric load 50, and may be serially connected to the first battery module B1 and the electric load 50. The switch 112 may electrically connect the first battery module B1 to the electric load 50 or electrically separate the first battery module B1 from the electric load 50. The first battery module B1 may be electrically connected to the electric load 50 when the switch 112 is on (closed), and the first battery module B1 may be electrically separated from the electric load 50 when the switch 112 is off (open).

The switch 113 may be provided between the second battery module B2 (a negative terminal) and the ground, and may be serially connected to the second battery module B2 and the ground. The switch 113 may electrically connect the second battery module B2 to the ground or electrically separate the second battery module B2 from the ground. The second battery module B2 may be electrically connected to the ground when the switch 113 is on (closed), and the second battery module B2 may be electrically separated from the ground when the switch 113 is off (open).

Each of the switches 111, 112, and 113 may be a semi-conductor device such as a metal-oxide-semiconductor field-effect transistor (MOSFET), bipolar junction transistor (BJT), an insulated gate bipolar transistor (IGBT), etc.

The charging control switch 60 may be provided between a charging terminal connected to an external power source and the battery pack 100 and may be serially connected between the charging terminal and the battery pack 100.

The charging control switch 60 may allow charging of the battery pack 100 from an external power source or block charging of the battery pack 100. When the external power source is connected to the charging terminal, the charging control switch 60 may electrically connect the charging terminal to the battery pack 100 according to a control signal of the controller 70. Thus, the battery pack 100 may be charged. The charging control switch 60 may separate the charging terminal from the battery pack 100 according to a control signal of the controller 70, and thus the battery pack 100 may be discharged.

The charging control switch 60 may be a semiconductor device such as a MOSFET, a BJT, an IGBT, etc.

The controller 70 may be electrically connected to the first switch module 110 and the charging control switch 60. The controller 70 may output a control signal for turning on or off the first switch module 110 and the charging control switch 60.

The controller 70 may include a processor 71 that generates a control signal for controlling an operation of the vehicle 1 and a memory 72 that stores or memorizes a program and/or data for controlling the operation of the vehicle 1. The processor 71 and the memory 72 may be implemented as separate semiconductor devices or a single semiconductor device. The controller 70 may include a plurality of processors or a plurality of memories.

The memory 72 may include a volatile memory such as a static random access memory (S-RAM), a dynamic random access memory (D-RAM), etc., and a non-volatile memory such as a read-only memory (ROM), an erasable programmable read only memory (EPROM), etc., and may store or memorize a program and/or data for controlling the first switch module 110 and the charging control switch 60. The memory 72 may include a single memory element or a plurality of memory elements.

The processor 71 may include a microprocessor, a microcontroller, an application specific integrated circuit (ASIC), or a field programmable gate array (FPGA). The processor 71 may include a single processor or a plurality of processors.

The controller 70 may output a control signal for turning ON/OFF the switches 111, 112, and 113 of the first switch module 110 based on a charging/discharging state of the battery pack 100. For example, the controller 70 may provide a control signal as illustrated in FIG. 3 to the first switch module 110.

To charge the battery pack 100, the controller 70 may provide a control signal for turning on the switch 111 and turning off the switches 112 and 113 to the first switch module 110. Thus, the first battery pack 100 may be charged together with other battery packs.

The controller 70 may provide a control signal for turning off the switch 111 and turning on the switches 112 and 113 to the first switch module 110 so that the battery pack 100 may supply low-voltage power to the electric load 50.

As described above, the vehicle 1 may include a single battery pack 100. The single battery pack 100 may supply high-voltage power to the driving circuit 32 and the driving motor 31 and supply low-voltage power to the electric load 50. Thus, the weight of the vehicle 1 may be lowered and the range of the vehicle 1 may be increased.

Figure 4:
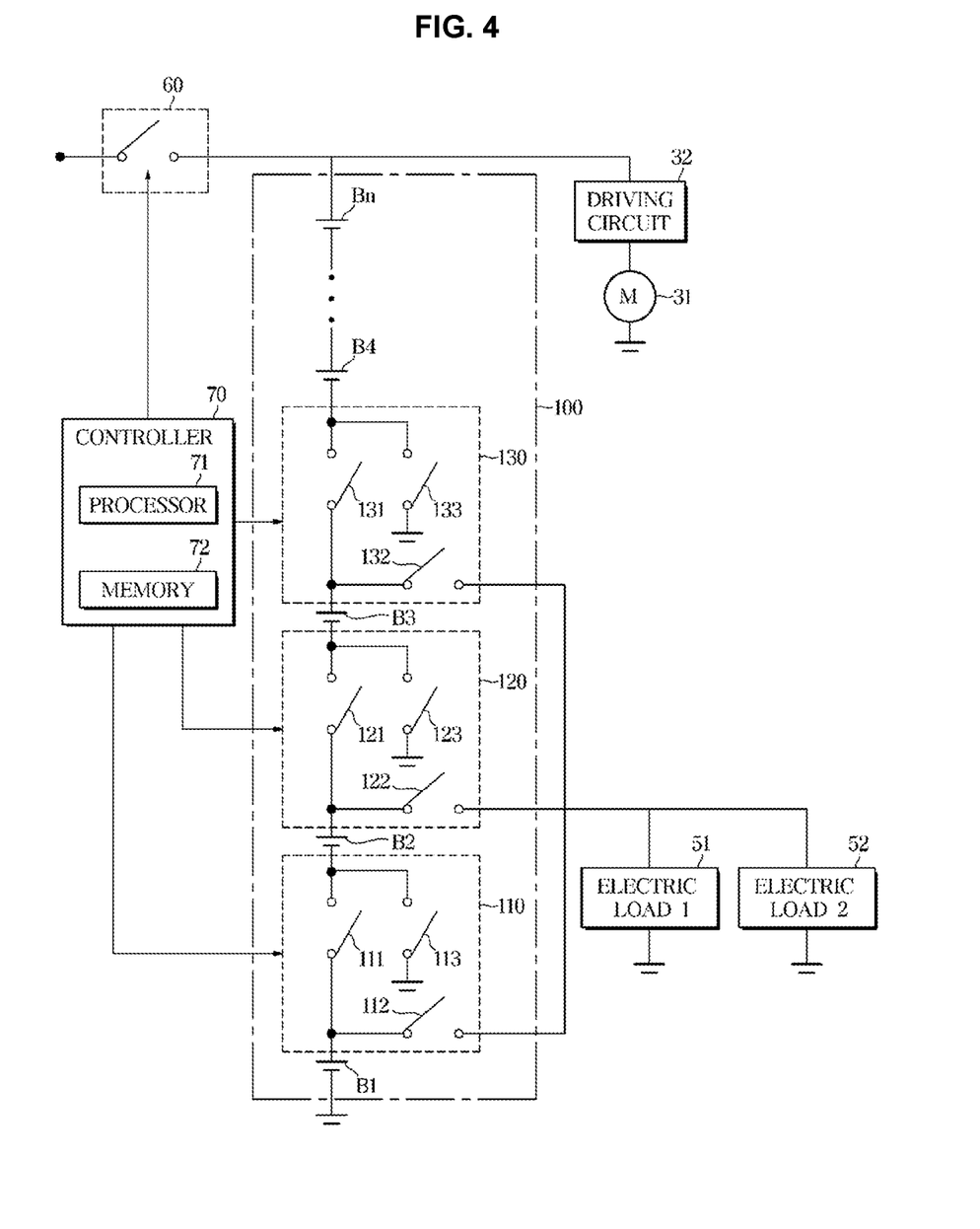
FIG. 4 illustrates an example of a battery included in a vehicle according to an exemplary embodiment of the present disclosure.
Figure 5:
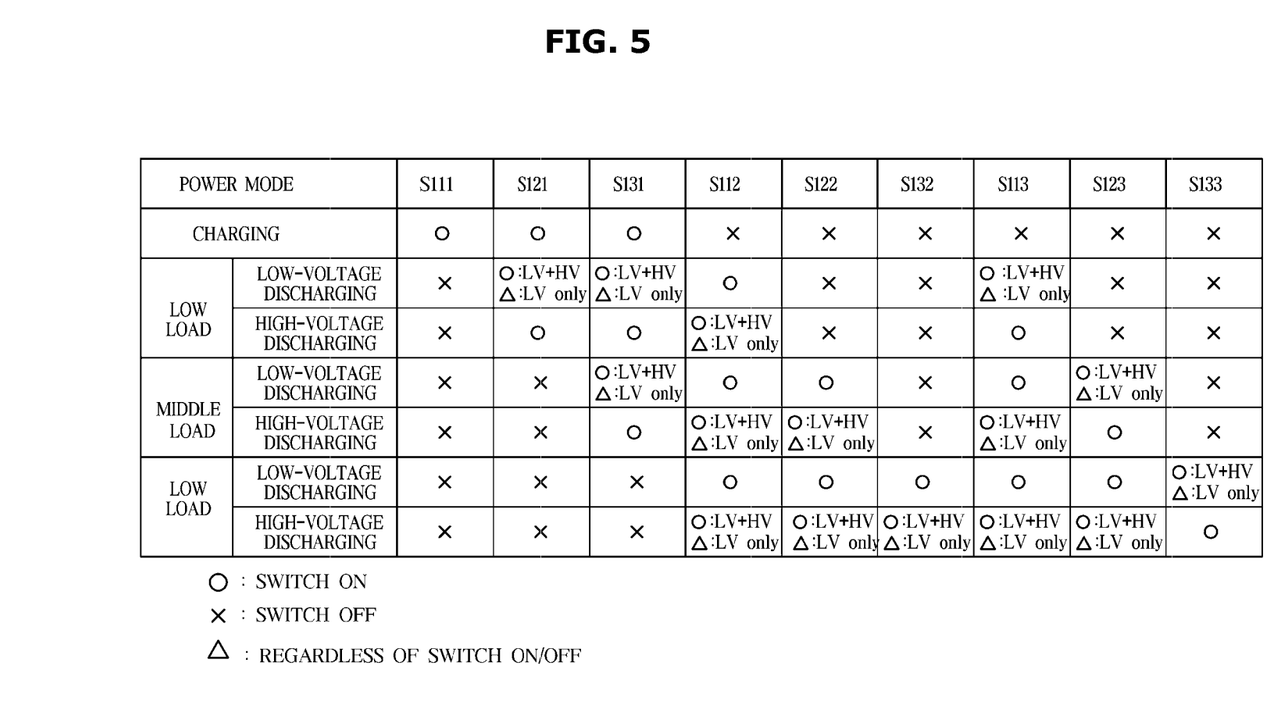
FIG. 5 illustrates an example for controlling switch modules shown in FIG. 4.

FIG. 4 illustrates an example of a battery included in a vehicle according to an exemplary embodiment of the present disclosure. FIG. 5 illustrates an example for controlling switch modules shown in FIG. 4.

Referring to FIG. 4 and FIG. 5, the vehicle 1 may include the driving circuit 32, the driving motor 31, the battery pack 100, a first electric load 51, a second electric load 52, the charging control switch 60, and the controller 70.

The driving circuit 32, the driving motor 31, and the charging control switch 60 may be the same as the driving circuit, the driving motor, and the charging control switch shown in FIG. 2.

The electric load may include the first electric load 51 and the second electric load 52. The second electric load 52 may require a greater power than the first electric load 51. For example, the second electric load 52 may include an electric steering device, an air conditioner, etc., which drives a motor, or a seat heater, an air conditioner, etc., which emits heat. The first electrical load 51 may include an audio device, a navigation device, etc., which requires low power.

The first electrical load 51 and the second electrical load 52 may obtain low-voltage power between 12 V and 48 V from the battery pack 100.

The battery pack 100 may store electrical energy and supply direct-current power to electric devices included in the vehicle 1. The battery pack 100 may supply high-voltage power to the driving circuit 32 and the driving motor 31 and supply low-voltage power to the first electric load 51 and the second electric load 52.

The battery pack 100 may include the plurality of battery modules B1, B2, B3, B4, . . . , Bn. Each of the battery modules B1, B2, B3, B4, . . . , Bn may output, for example, power of a low voltage of about 14.8 V.

The plurality of battery modules B1, B2, B3, B4, . . . , Bn may be serially connected to supply the high-voltage power to the driving circuit 32 and the driving motor 31. Herein, some of the plurality of battery modules B1, B2, B3, B4, . . . , Bn may supply the low-voltage power to the electric load 50. For example, the first battery module B1, the second battery module B2, and the third battery module B3 may supply the low-voltage power to the first electric load 51 and the second electric load 52.

The battery pack 100 may include the plurality of switch modules 110, 120, and 130 provided between the plurality of battery modules B1, B2, B3, B4, . . . , Bn. For example, as illustrated in FIG. 4, the battery pack 100 may include the first switch module 110 provided between the first battery module B1 and the second battery module B2, the second switch module 120 provided between the second battery module B2 and the third battery module B3, and the third switch module 130 provided between the third battery module B3 and the fourth battery module B4.

The first switch module 110 may be electrically connected to the first battery module B1, the second battery module B2, the electric loads 51 and 52, and the ground. The first switch module 110 may connect or disconnect the first battery module B1 to or from the second battery module B2, connect or disconnect the first battery module B1 to or from the electric loas 51 and 52, or connect or disconnect the second battery module B2 to or from the ground.

The first switch module 110 may include the switch 111 provided between the first battery module B1 and the second battery module B2, the switch 112 provided between the first battery module B1 and the electric loads 51 and 52, and the switch 113 provided between the second battery module B2 and the ground. Operations of the switch 111, the switch 112, and the switch 113 may be the same as those of the switch 111, the switch 112, and the switch 113 illustrated in FIG. 2.

The second switch module 120 may be electrically connected to the second battery module B2, the third battery module B3, the electric loads 51 and 52, and the ground. The second switch module 120 may connect or disconnect the second battery module B2 to or from the third battery module B3, connect or disconnect the second battery module B2 to or from the electric loas 51 and 52, or connect or disconnect the third battery module B3 to or from the ground.

The second switch module 120 may include a switch 121 provided between the second battery module B2 and the third battery module B3, a switch 122 provided between the second battery module B2 and the electric loads 51 and 52, and a switch 123 provided between the third battery module B3 and the ground. The switch 121, the switch 122, and the switch 123 are connected to battery modules different from those to which the switch 111, the switch 112, and the switch 113 are connected, but those of ordinary skill in the art may easily expect operations of the switch 121, the switch 122, and the switch 123 from the operations of the switch 111, the switch 112, and the switch 113.

The third switch module 130 may be electrically connected to the third battery module B3, the fourth battery module B4, the electric loads 51 and 52, and the ground. The third switch module 130 may connect or disconnect the third battery module B3 to or from the fourth battery module B4, connect or disconnect the third battery module B3 to or from the electric loas 51 and 52, or connect or disconnect the fourth battery module B4 to or from the ground.

The third switch module 130 may include a switch 131 provided between the third battery module B3 and the fourth battery module B4, a switch 132 provided between the third battery module B3 and the electric loads 51 and 52, and a switch 133 provided between the fourth battery module B4 and the ground. The switch 131, the switch 132, and the switch 133 are connected to battery modules different from those to which the switch 111, the switch 112, and the switch 113 are connected, but those of ordinary skill in the art may easily expect operations of the switch 131, the switch 132, and the switch 133 from the operations of the switch 111, the switch 112, and the switch 113.

The controller 70 may be electrically connected to the first switch module 110, the second switch module 120, the third switch module 130, and the charging control switch 60. The controller 70 may output a control signal for turning on or off the first switch module 110, the second switch module 120, the third switch module 130, and the charging control switch 60.

The controller 70 may further include a processor 71 and a memory 72.

The controller 70 may output a control signal for turning ON/OFF switches of the first switch module 110, the second switch module, and the third switch module 130 based on a charging/discharging state of the battery pack 100. To charge the battery pack 100, the controller 70 may turn on the switch 111, the switch 121, and the switch 131, turn off the switch 112, the switch 122, and the switch 132, and turn off the switch 113, the switch 123, and the switch 133.

The controller 70 may output a control signal for turning ON/OFF the switches of the first switch module 110, the second switch module 120, and the third switch module 130 based on power required by the electric loads 51 and 52.

For example, when low-voltage power is supplied to the first electric load 51 that consumes low power (for a low load of FIG. 5), the controller 70 may control the switches of the first switch module 110, the second switch module 120, and the third switch module 130 to allow the first battery module B1 to supply the low-voltage power to the first electric load 51. That is, when low-voltage power less than a first reference power is supplied, the controller 70 may control the switches of the first switch module 110, the second switch module 120, and the third switch module 130 to allow the first battery module B1 to supply the low-voltage power to an electric load.

As illustrated in FIG. 5, the controller 70 may turn off the switch 111 and turn on the switch 121 and the switch 131, electrically separating the first battery module B1 from the other battery modules. The controller 70 may turn on the switch 112 and turn off the switch 122 and the switch 132, electrically connecting the first battery module B1 to the electric loads 51 and 52. The controller 70 may turn on the switch 113 and turn off the switch 123 and the switch 133, electrically connecting the battery modules to the ground. However, when the high-voltage power is not supplied to the driving circuit 32 and the driving motor 31, the switch 121, the switch 131, and the switch 113 may be turned on or off.

In the present way, the controller 70 may separate the first battery module B1 from the other battery modules and control the switch modules 110, 120, and 130 to allow the first battery module B1 to supply low-voltage power to the electric loads 51 and 52.

Moreover, by switch control described above, the other battery modules than the first battery module B1 may supply high-voltage power to the driving circuit 32 and the driving motor 31. However, when power is not supplied to the low-voltage electric loads 51 and 52, the switch 112 may be turned on or off.

In another example, when low-voltage power is supplied to the second electric load 52 that consumes high power (for a middle load of FIG. 5), the controller 70 may control the switches of the first switch module 110, the second switch module 120, and the third switch module 130 to allow the first battery module B1 and the second battery module B2 to supply the low-voltage power to the second electric load 52. That is, when low-voltage power greater than or equal to the first reference power and less than a second reference power is supplied, the controller 70 may control the switches of the first switch module 110, the second switch module 120, and the third switch module 130 to allow the first battery module B1 and the second battery module B2 to supply the low-voltage power to an electric load.

As illustrated in FIG. 5, the controller 70 may turn off the switch 111 and the switch 121 and turn on the switch 131, electrically separating the first battery module B1 and the second battery module B2 from the other battery modules. The controller 70 may turn on the switch 112 and the switch 122 and turn off the switch 132, electrically connecting the first battery module B1 and the second battery module B2 to the electric loads 51 and 52. The controller 70 may turn on the switch 113 and the switch 123 and turn off the switch 133, electrically connecting the battery modules to the ground. However, when the high-voltage power is not supplied to the driving circuit 32 and the driving motor 31, the switch 131 and the switch 123 may be turned on or off.

In the present way, the controller 70 may separate the first battery module B1 and the second battery module B2 from the other battery modules and control the switch modules 110, 120, and 130 to allow the first battery module B1 and the second battery module B2 to supply low-voltage power to the electric loads 51 and 52.

Moreover, by switch control described above, the other battery modules than the first battery module B1 and the second battery module B2 may supply high-voltage power to the driving circuit 32 and the driving motor 31. However, when power is not supplied to the low-voltage electric loads 51 and 52, the switch 112, the switch 122, and the switch 113 may be turned on or off.

In another example, when low-voltage power is supplied to both the first electric load 51 and the second electric load 52 (for a high load of FIG. 5), the controller 70 may control the switches of the first switch module 110, the second switch module 120, and the third switch module 130 to allow the first battery module B1, the second battery module B2, and the third battery module B3 to supply the low-voltage power to the electric loads 51 and 52. That is, when low-voltage power equal to or greater than the second reference power is supplied, the controller 70 may control the switches of the first switch module 110, the second switch module 120, and the third switch module 130 to allow the first battery module B1, the second battery module B2, and the third battery module B3 to supply the low-voltage power to an electric load.

As illustrated in FIG. 5, the controller 70 may turn off the switch 111, the switch 121, and the switch 131, electrically separating the first battery module B1, the second battery module B2, and the third battery module B3 from the other battery modules. The controller 70 may turn on the switch 112, the switch 122, and the switch 132, electrically connecting the first battery module B1, the second battery module B2, and the third battery module B3 to the electric loads 51 and 52. The controller 70 may turn on the switch 113, the switch 123, and the switch 133, electrically connecting the battery modules to the ground. However, when the high-voltage power is not supplied to the driving circuit 32 and the driving motor 31, the switch 131 and the switch 123 may be turned on or off.

In the present way, the controller 70 may separate the first battery module B1, the second battery module B2, and the third battery module B3 from the other battery modules and control the switch modules 110, 120, and 130 to allow the first battery module B1, the second battery module B2, and the third battery module B3 to supply low-voltage power to the electric loads 51 and 52.

Moreover, by switch control described above, the other battery modules than the first battery module B1, the second battery module B2, and the third battery module B3 may supply high-voltage power to the driving circuit 32 and the driving motor 31. However, when power is not supplied to the low-voltage electric loads 51 and 52, the switch 112, the switch 122, the switch 132, the switch 113, and the switch 123 may be turned on or off.

As described above, the vehicle 1 may include a single battery pack 100. The single battery pack 100 may supply high-voltage power to the driving circuit 32 and the driving motor 31 and supply low-voltage power to the electric load 50. Furthermore, the vehicle 1 may change the number of battery modules supplying power to the electric load 50 according to a load size of the electric load 50.

Figure 6:
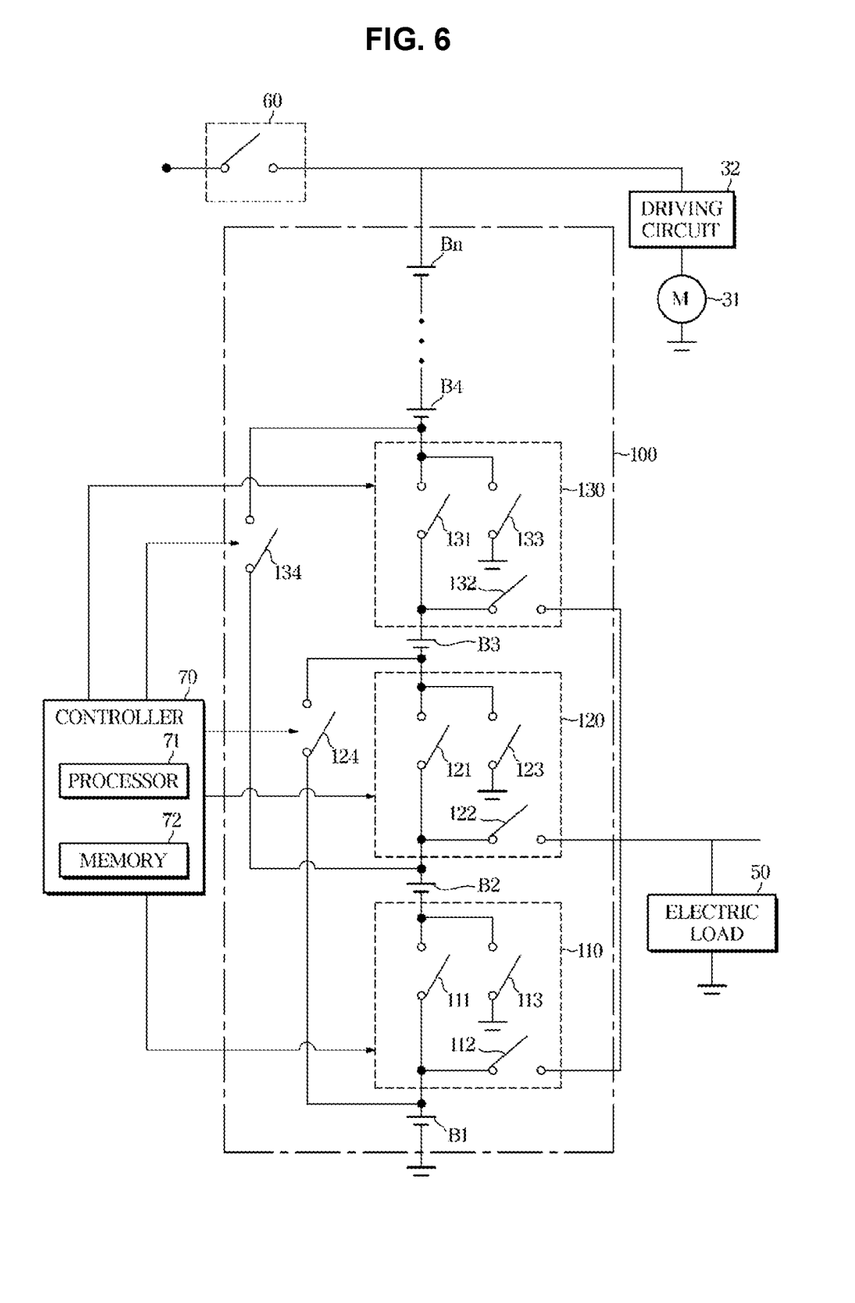
FIG. 6 illustrates an example of a battery included in a vehicle according to an exemplary embodiment of the present disclosure.
Figure 7:
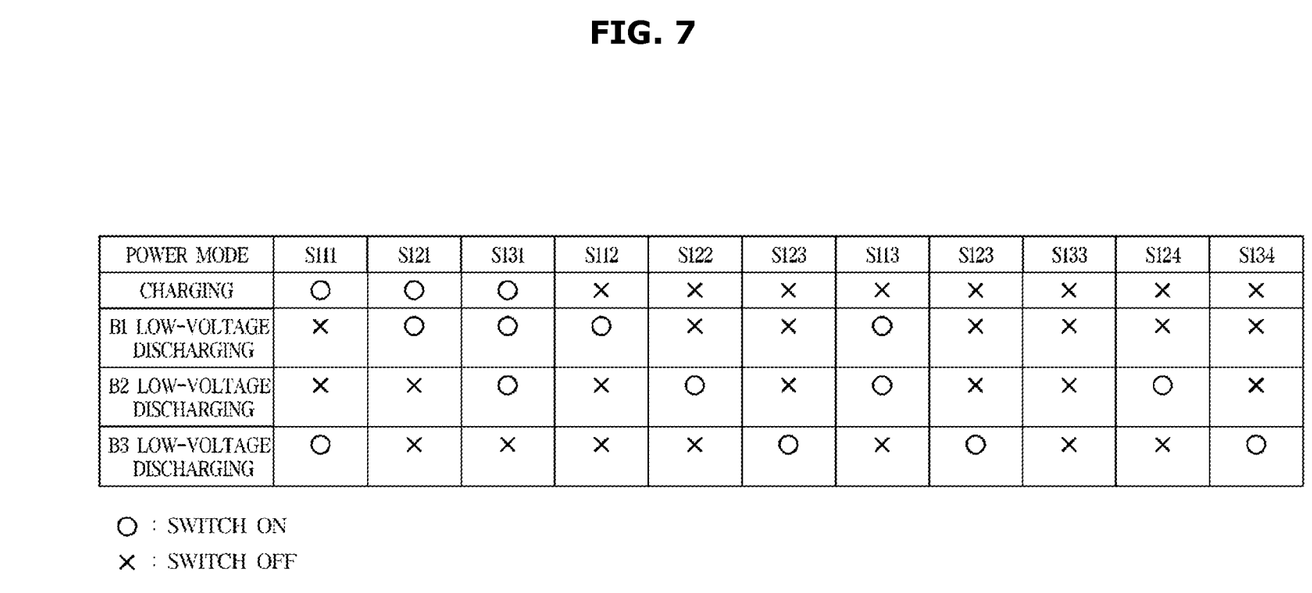
FIG. 7 illustrates an example for controlling switch modules shown in FIG. 6.

FIG. 6 illustrates an example of a battery included in a vehicle according to an exemplary embodiment of the present disclosure. FIG. 7 illustrates an example for controlling switch modules shown in FIG. 6.

Referring to FIG. 5 and FIG. 6, the vehicle 1 may include the driving circuit 32, the driving motor 31, the battery pack 100, the electric load 50, the charging control switch 60, and the controller 70.

The driving circuit 32, the driving motor 31, the charging control switch 60, and the electric load 50 may be the same as the driving circuit, the driving motor, the charging control switch, and the electric load shown in FIG. 2.

The battery pack 100 may include the plurality of battery modules B1, B2, B3, B4, . . . , Bn that output, for example, power of a low voltage of 14.8 V.

The battery pack 100 may include the plurality of switch modules 110, 120, and 130 provided between the plurality of battery modules B1, B2, B3, B4, . . . , Bn. For example, as illustrated in FIG. 6, the battery pack 100 may include the first switch module 110 provided between the first battery module B1 and the second battery module B2, the second switch module 120 provided between the second battery module B2 and the third battery module B3, and the third switch module 130 provided between the third battery module B3 and the fourth battery module B4.

The first switch module 110 may include the switch 111, the switch 112, and the switch 113, and arrangement thereof may be the same as those of the switch 111, the switch 112, and the switch 113 illustrated in FIG. 4. The second switch module 120 may include the switch 121, the switch 122, and the switch 123, and arrangement thereof may be the same as those of the switch 121, the switch 122, and the switch 123 illustrated in FIG. 4. The third switch module 130 may include the switch 131, the switch 132, and the switch 133, and arrangement thereof may be the same as those of the switch 131, the switch 132, and the switch 133 illustrated in FIG. 4.

Furthermore, the battery pack 100 may include a plurality of switches for bypassing each of the battery modules B1, B2, B3, B4, and . . . , Bn. For example, as illustrated in FIG. 6, the battery pack 100 may further include a switch 124 for bypassing the second battery module B2 and a switch 134 for bypassing the third battery module B3. Herein, the switch 113 may be used as a switch for bypassing the first battery module B1.

The controller 70 may be electrically connected to the first switch module 110, the second switch module 120, the third switch module 130, the switch 124, the switch 134, and the charging control switch 60. The controller 70 may output a control signal for turning on or off the first switch module 110, the second switch module 120, the third switch module 130, the switch 124, the switch 134, and the charging control switch 60.

The controller 70 may further include a processor 71 and a memory 72.

The controller 70 may output a control signal for turning ON/OFF switches of the first switch module 110, the second switch module, and the third switch module 130 based on a charging/discharging state of the battery pack 100. To charge the battery pack 100, the controller 70 may turn on the switch 111, the switch 121, and the switch 131, turn off the switch 112, the switch 122, and the switch 132, and turn off the switch 113, the switch 123, the switch 133, the switch 123, and the switch 134.

The controller 70 may control the switches the second switch module 120 and the third switch module 130 to allow the plurality of battery modules to sequentially low-voltage power to the electric load 50. For example, the controller 70 may control the switches of the second switch module 120 and the third switch module 130 based on an output voltage of each of the battery modules B1, B2, B3, B4, . . . , Bn. That is, a battery module that supplies low-voltage power to the electric load 50 may be changed, maintaining voltage balance between battery modules.

For example, the controller 70 may control the first switch module 110, the second switch module 120, the third switch module 130, the switch 124, and the switch 134 to allow the first battery module B1 to supply the low-voltage power to the electric load 50.

As illustrated in FIG. 6, the controller 70 may turn off the switch 111 and turn on the switch 121 and the switch 131, electrically separating the first battery module B1 from the other battery modules. The controller 70 may turn on the switch 112 and turn off the switch 122 and the switch 132, electrically connecting the first battery module B1 to the electric load 50. The controller 70 may turn on the switch 113 and turn off the switch 123 and the switch 133, electrically connecting the battery modules to the ground. The controller 70 may turn on the switch 113 and turn off the switch 124 and the switch 134, bypassing the first battery module B1.

In the present way, the controller 70 may separate the first battery module B1 from the other battery modules and control the switch modules 110, 120, and 130 to allow the first battery module B1 to supply low-voltage power to the electric load 50.

In another example, the controller 70 may control the first switch module 110, the second switch module 120, the third switch module 130, the switch 124, and the switch 134 to allow the second battery module B2 to supply the low-voltage power to the electric load 50.

As illustrated in FIG. 6, the controller 70 may turn off the switch 111 and the switch 121 and turn on the switch 131, electrically separating the second battery module B2 from the other battery modules. The controller 70 may turn on the switch 122 and turn off the switch 112 and the switch 132, electrically connecting the second battery module B2 to the electric load 50. The controller 70 may turn on the switch 113 and turn off the switch 123 and the switch 133, electrically connecting the second battery module B2 to the ground. The controller 70 may turn on the switch 124 and turn off the switch 134, bypassing the second battery module B2. In other words, the first battery module B1 may be electrically connected to the other battery modules than the second battery module B2.

In the present way, the controller 70 may separate the second battery module B2 from the other battery modules and control the switch modules 110, 120, and 130 to allow the second battery module B2 to supply low-voltage power to the electric load 50.

In another example, the controller 70 may control the first switch module 110, the second switch module 120, the third switch module 130, the switch 124, and the switch 134 to allow the third battery module B3 to supply the low-voltage power to the electric load 50.

As illustrated in FIG. 6, the controller 70 may turn on the switch 111 and turn off the switch 121 and the switch 131, electrically separating the third battery module B3 from the other battery modules. The controller 70 may turn off the switch 121 and the switch 122 and turn on the switch 132, electrically connecting the third battery module B3 to the electric load 50. The controller 70 may turn on the switch 123 and turn off the switch 113 and the switch 133, electrically connecting the third battery module B3 to the ground. The controller 70 may turn off the switch 124 and turn on the switch 134, bypassing the third battery module B3. In other words, the first battery module B1 and the second battery module B2 may be electrically connected to the other battery modules than the third battery module B3.

In the present way, the controller 70 may separate the third battery module B3 from the other battery modules and control the switch modules 110, 120, and 130 to allow the third battery module B3 to supply low-voltage power to the electric load 50.

As described above, the vehicle 1 may include the single battery pack 100. The single battery pack 100 may supply high-voltage power to the driving circuit 32 and the driving motor 31 and supply low-voltage power to the electric load 50. The vehicle 1 may change a battery module that supplies power to the electric load 50 to equalize the output voltages of the battery modules.

According to an aspect of the present disclosure, a vehicle including a single battery pack excluding an auxiliary battery pack and a method of controlling the vehicle may be provided. Hence, it is possible to prevent the weight of the vehicle from being increased due to inclusion of a plurality of battery packs.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
   a driving motor;
   an electric load;
   a battery pack including a plurality of battery modules that supplies power to the driving motor and the electric load and a switch module provided between the plurality of battery modules; and
   a controller operatively connected to the switch module and configured to control the switch module,
   wherein the controller is further configured to control the switch module to supply a power including a first voltage to the driving motor and to supply a power including a second voltage less than the first voltage to the electric load through the switch module,
   wherein some of the plurality of battery modules supply a power including the first voltage to the driving motor, and other of the plurality of battery modules supply a power including the second voltage to the electric load, and
   wherein the controller is further configured to control the switch module to adjust a number of battery modules supplying power to the electric load among the plurality of battery modules, thereby adjusting the second voltage.

2. The vehicle of claim 1, wherein the controller is further configured to control the switch module to connect or separate at least one battery module among the plurality of battery modules to or from the electric load, based on charging and discharging of the battery pack.

3. The vehicle of claim 2,
wherein the plurality of battery module includes a first battery module and a second battery module, and
wherein the switch module includes:
a first switch provided between the first battery module and second battery module; and
a second switch provided between the first battery module and the electric load.

4. The vehicle of claim 3, wherein the controller is further configured to:
turn on the first switch and turn off the second switch to charge the battery pack; and
turn off the first switch and turn on the second switch to supply the power including the second voltage to the electric load.

5. The vehicle of claim 3, wherein the controller is further configured to control the switch module to electrically connect at least one of the first battery module and the second battery module among the plurality of battery modules to the electric load, based on a load size of the electric load.

6. The vehicle of claim 5, wherein the controller is further configured to:
control the switch module to electrically connect the first battery module to the electric load when a required power of the electric load is less than a reference power; and
control the switch module to electrically connect the first battery module and the second battery module to the electric load when the required power of the electric load is equal to or greater than the reference power.

7. The vehicle of claim 5,
wherein the plurality of battery module further includes a third battery module, and
wherein the switch module further includes:
a third switch provided between the second battery module and the third battery module; and
a fourth switch provided between the second battery module and the electric load.

8. The vehicle of claim 7, wherein the controller is further configured to:
turn off the first switch and the fourth switch and turn on the second switch and the third switch to supply a first power to the electric load; and
turn off the first switch and the third switch and turn on the second switch and the fourth switch to supply a second power greater than the first power to the electric load.

9. The vehicle of claim 3, wherein the controller is further configured to control the switch module to alternately connect the first battery module and the second battery module among the plurality of battery modules to the electric load, based on output voltages of the battery modules.

10. The vehicle of claim 9,
wherein the plurality of battery module further includes a third battery module, and
wherein the switch module further includes:
a third switch configured to bypass the first battery module;
a fourth switch provided between the second battery module and the third battery module;
a fifth switch provided between the second battery module and the electric load; and
a sixth switch configured to bypass the second battery module.

11. The vehicle of claim 10, wherein the controller is further configured to:
turn off the first switch, the fifth switch, and the sixth switch and turn on the second switch, the third switch, and the fourth switch to allow the first battery module to supply a power to the electric load; and
turn on the third switch and the fifth switch and turn off the first switch, the second switch, fourth switch, and the sixth switch to allow the second battery module to supply a power to the electric load.

12. A method of controlling a vehicle including a driving motor, an electric load, and a battery pack, the method comprising:
supplying, by a plurality of battery modules included in the battery pack, a power including a first voltage to the driving motor; and
supplying, by at least one battery module among the plurality of battery modules included in the battery pack, a power including a second voltage less than the first voltage to the electric load,
wherein some of the plurality of battery modules supply a power including the first voltage to the driving motor, and other of the plurality of battery modules supply a power including the second voltage to the electric load, and
wherein a controller is configured to control the switch module to adjust a number of battery modules supplying power to the electric load among the plurality of battery modules, thereby adjusting the second voltage.

13. The method of claim 12, further including connecting or separating, by the controller configured to control a switch module provided between the plurality of battery modules, at least one battery module among the plurality of battery modules to or from the electric load, based on charging and discharging of the battery pack.

14. The method of claim 13, further including:
to charge the battery pack, turning on, by the controller configured to control the switch module including a first switch and a second switch, the first switch provided between a first battery module and a second battery module and turning off, by the controller, the second switch provided between the first battery module and the electric load; and
to supply a power to the electric load, turning off, by the controller, the first switch and turning on, by the controller, the second switch.

15. The method of claim 14, further including electrically connecting, by the controller configured to control a switch module provided between the plurality of battery modules, a first battery module or a second battery module of the at least one battery module to the electric load, based on a load size of the electric load.

16. The method of claim 15, further including:
electrically connecting, by the controller, the first battery module to the electric load when a required power of the electric load is less than a reference power, and
electrically connecting, by the controller, the first battery module and the second battery module to the electric load when the required power of the electric load is equal to or greater than the reference power.

17. The method of claim 15, further including:
to supply a first power to the electric load, turning off, by the controller configured to control the switch module further including a third switch and a fourth switch, the first switch tuning on, by the controller, the second switch, turning on, by the controller, the third switch provided between the second battery module and a third battery module, and turning off, by the controller, the fourth switch provided between the second battery module and the electric load; and to supply a second power greater than the first power to the electric load, turning off, by the controller, the first switch and the third switch and turning on, by the controller, the second switch and the fourth switch.

18. The method of claim 14, further including alternately connecting, by the controller configured to control a switch module provided between the plurality of battery modules, the first battery module and the second battery module among the plurality of battery modules to the electric load, based on output voltages of the battery modules.

19. The method of claim 18, further including:

turning off, by the controller configured to control the switch module further including a third switch, a fourth switch, a fifth switch and a sixth switch, the first switch, turning on, by the controller, the second switch, and turning on, by the controller, the third switch that bypasses the first battery module to allow the first battery module to supply a power to the electric load; and turning off, by the controller, the fourth switch provided between the second battery module and a third battery module, turning on, by the controller, the fifth switch provided between the second battery module and the electric load, and turning on, by the controller, the sixth switch that bypasses the second battery module to allow the second battery module to supply a power to the electric load.

\* \* \* \* \*